US005259202A

United States Patent [19]

Nishiguchi et al.

[11] Patent Number: 5,259,202

[45] Date of Patent: Nov. 9, 1993

[54] ABSORPTION AIR-CONDITIONING SYSTEM

[75] Inventors: Akira Nishiguchi, Ushiku; Tomihisa Ohuchi, Tsukuba; Daisuke Hisajima, Ibaraki; Michihiko Aizawa, Ushiku, all of Japan

[73] Assignee: Hitachi, Ltd., Tokyo, Japan

[21] Appl. No.: 827,749

[22] Filed: Jan. 29, 1992

[30] Foreign Application Priority Data

Jan. 29, 1991 [JP] Japan .......... 3-008915

[51] Int. Cl.[5] .......... F25B 15/00

[52] U.S. Cl. .......... 62/147; 62/476

[58] Field of Search .......... 62/141, 147, 476

[56] References Cited

U.S. PATENT DOCUMENTS 3,374,644 3/1968 Foster .......... 62/141
3,626,710 12/1971 Porter .......... 62/141
4,972,679 11/1990 Petty et al. .......... 62/476

*Primary Examiner*—John M. Sollecito
*Attorney, Agent, or Firm*—Antonelli, Terry, Stout & Kraus

[57] ABSTRACT

In an absorption air-conditioning system, in order to immediately stop indoor air-conditions by a stop signal of the indoor air-conditioners and improve characteristics for activating the system , such as, by effecting re-activation at a relatively short time interval after stopping the operation of the system, when the last one of the operating indoor air-conditioners is stopped, a stop signal is sent to a control device from a controller for the indoor air-conditioner, and in response to this signal, the control device effects the control of stopping a burner, a cooling medium circulating pump, a cooling water pump and a cold/hot water, pump. A solution circulating pump, however, continues operating and the solution, while kept at a high concentration, is circulated through an absorber, a high-temperature regenerator and a low-temperature regenerator. During this time, an indicated value of a temperature sensor gradually decreases, and when this value reaches a predetermined temperature, the control device switches a control valve from its open condition to its closed condition and another control valve from its closed condition to its open condition, and also activates the cooling medium circulating pump again to feed a cooling medium to a solution reservoir at a lower portion of the absorber, thereby diluting the solution.

12 Claims, 6 Drawing Sheets

F I G. 5
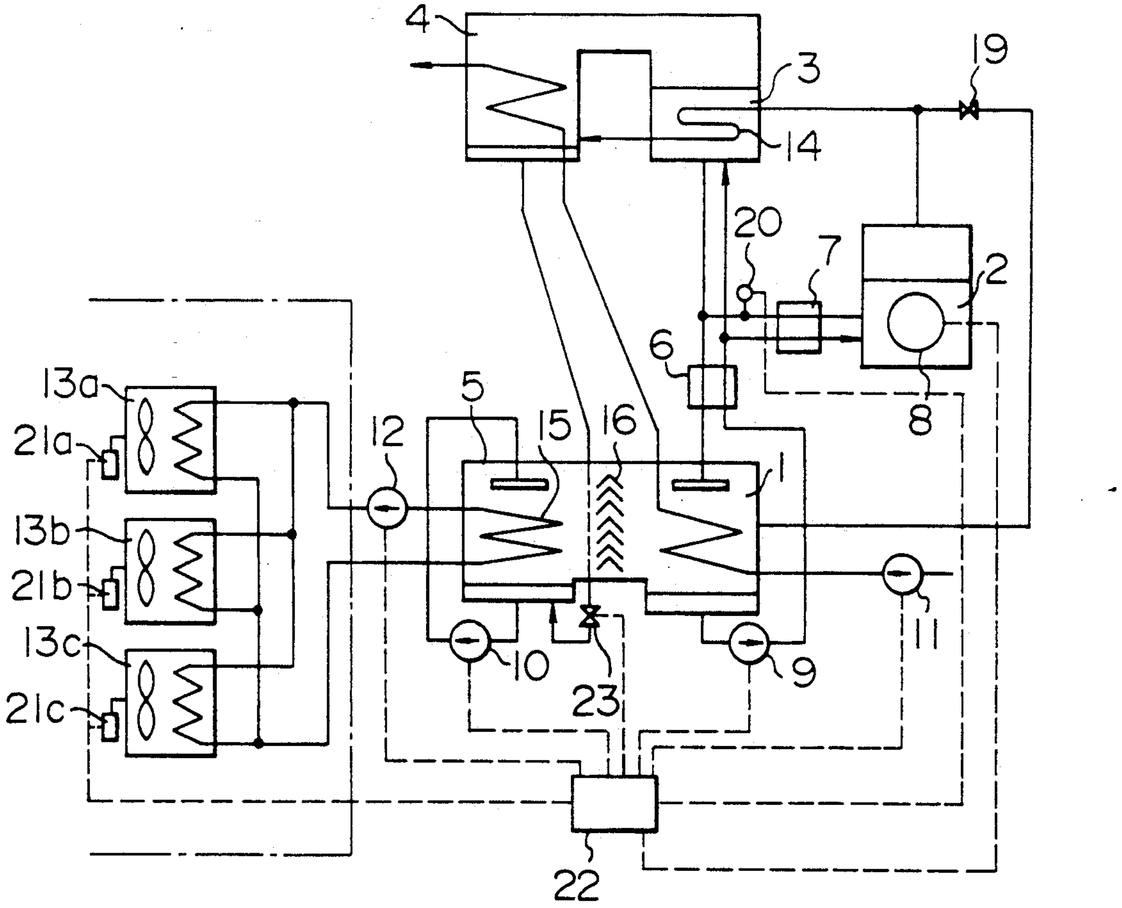

ABSORPTION AIR-CONDITIONING SYSTEM

BACKGROUND OF THE INVENTION

This invention relates to an absorption air-conditioning system which uses an absorption cold/hot water device as an outdoor unit, and a fan coil unit or an air handling unit as an indoor unit.

In a conventional apparatus, as disclosed in Japanese Patent Unexamined Publication No. 2-213659, when the operation of an absorption refrigerator is stopped, a cooling medium circulating pump, a solution circulating pump, a cold water pump and a cooling water pump are operated to perform a dilution operation immediately in order to prevent the crystallization of a solution.

In the above conventional apparatus, when the operation of the absorption refrigerator is stopped, indoor air-conditioners cannot be stopped immediately, because the cold/hot water pump, the cooling water pump, the cooling medium circulating pump and the solution circulating pump are operated so that the cooling medium can be evaporated and absorbed in the solution, thereby effecting the dilution. Thus, after the cooling or heating operation in rooms is stopped, the indoor air-conditioners continue to operate wastefully. This unnecessary extended air-conditioning operation adversely affects peoples comfort in the rooms. In addition, the dilution of the solution is effected immediately after the operation of the absorption refrigerator is stopped, and therefore when the apparatus is required to operate again after a certain period of time from stopping the operation, it takes much time to resume the air-conditioning. That is because the dilution of the solution is already completed in order for the apparatus to resume operation, the solution must be changed to its concentrated form again.

SUMMARY OF THE INVENTION

It is an object of the present invention to provide an absorption air-conditioning system in which the operation of indoor air-conditioners can be stopped immediately after stopping the operation of the system so as to eliminate a wasteful operation, thereby maintain the comfort level in a room, and when the system is to be activated again at a certain time interval after stopping the operation of the system, the activating operation can be completed relatively rapidly to achieve a required air-conditioning.

To the above end, according to the present invention, there is provided an absorption air-conditioning system comprising an outdoor unit including an absorber, a high-temperature regenerator, a low-temperature regenerator, a solution heat exchanger, a condenser and an evaporator which are operatively connected together by piping having transport means for transporting a solution and a cooling medium; and an indoor air-conditioner connected to the outdoor unit by a cold/hot water pipe having a cold/hot water pump; wherein after the operation of the indoor air-conditioner is stopped through a stop signal at the indoor air-conditioner side, the solution dilution operation of the outdoor unit is not immediately carried out, but is carried out upon lapse of a certain time period.

With the above control of the absorption air-conditioning system, the following effects are achieved.

Since the indoor air-conditioners are stopped immediately when stopping the absorption air-conditioning system, the wasteful operation of the indoor air-conditioners is avoided, and the comfort level in rooms can be maintained. Additionally, since the dilution operation is not carried out immediately after stopping the absorption air-conditioning system, the solution in this system is kept in a relatively concentrated condition for a while after the operation of the system becomes stopped. If the absorption air-conditioning system is required to be again activated during this time, the system can be activated relatively rapidly to effect the air-conditioning operation rapidly.

BRIEF DESCRIPTION OF THE DRAWINGS

FIG. 5 is a system diagram of a further embodiment of the invention; and

DESCRIPTION OF THE PREFERRED EMBODIMENTS

A preferred embodiment of the present invention will now be described with reference to FIG. 1.

Figure 1:
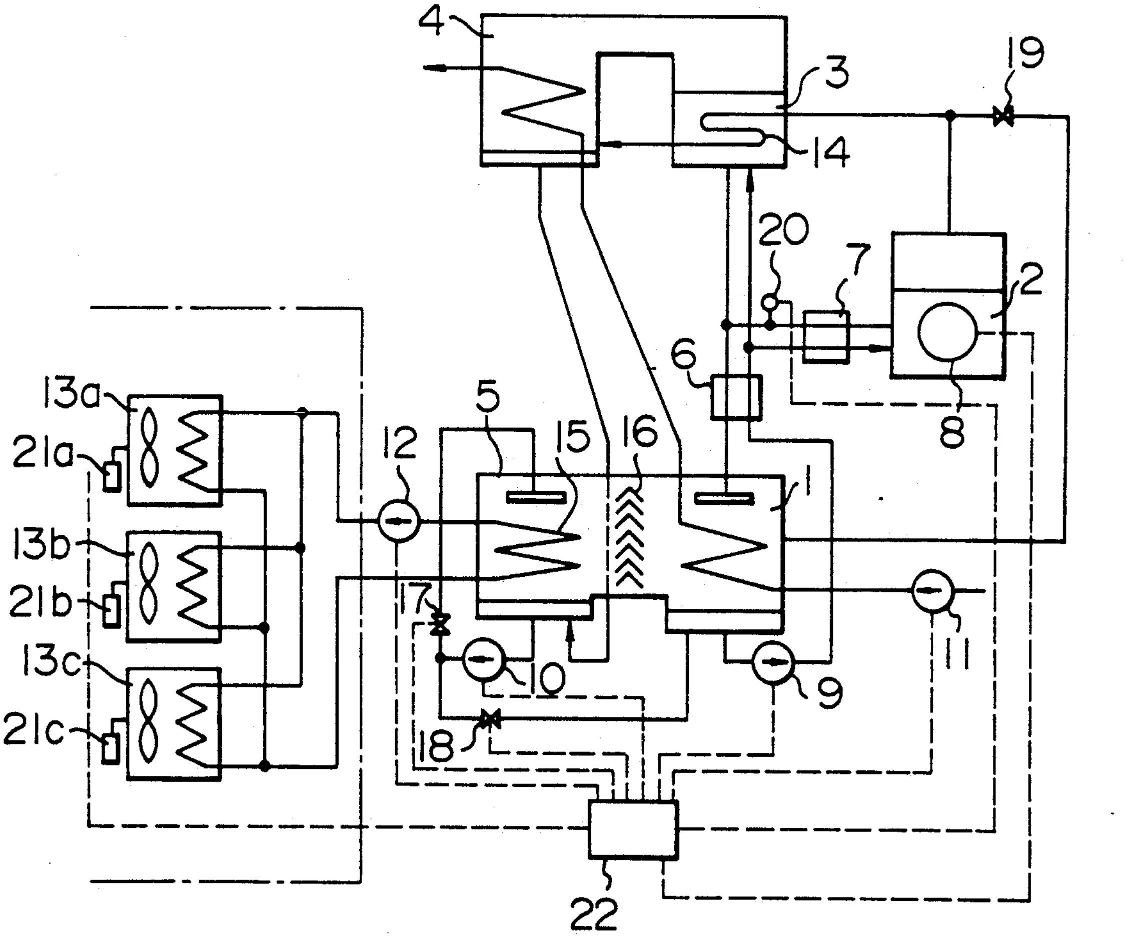
FIG. 1 is a system diagram of a preferred embodiment of the present invention.

As shown in FIG. 1, as absorption air-conditioning system comprises an absorber 1, a high-temperature regenerator 2, a low-temperature regenerator 3, a condenser 4, an evaporator 5, a first solution heat exchanger 6, a second solution heat exchanger 7, a burner 8, a solution circulating pump 9, a cooling medium circulating pump 10, a cooling water pump 11, a cold/hot water pump 12, indoor air-conditioners 13*a*, 13*b* and 13*c*, control valves 17 and 18, etc. These devices are operatively connected to one another via piping. A temperature sensor 20 is provided on a solution return pipe (which leads to the absorber 1) at the outlet side of the second solution heater exchanger 7. The above system also comprises a control device 22 for controlling the burner 8, the solution circulating pump 9, the cooling medium circulating pump 10, the cooling water pump 11, the cold/hot water pump 12 and the control valves 17 and 18 in accordance with a signal from the temperature sensor 20 and start and stop signals from controllers 21*a*, 21*b* and 21*c* for the indoor air-conditioners 13*a*, 13*b* and 13*c*.

During the cooling air-conditioning operation, the system operates as follows. A concentrated aqueous solution of lithium bromide is cooled at the absorber 1 by cooling water which is fed by the cooling water pump 11, and the vapor of a cooling medium from the evaporator 5 is absorbed, so that the concentration of this solution becomes low. The dilution solution of a low concentration is fed by the solution circulating pump 9 to the high-temperature regenerator 2 and the low-temperature regenerator 3 via the first solution heat exchanger 6 and the second solution heat exchanger 7. In the first solution heat exchanger 6, the dilution solution effects a heat exchanger with the solution into which the concentrated solution from the high-temperature regenerator 2 and the concentrated solution from the low-temperature regenerator 3 have flowed together, so that the temperature of this dilution solution rises, and the dilution solution is fed to the low-temperature regenerator 3. Then, in the second solution heat exchanger 7, the dilution solution effects a heat exchange with the concentrated solution from the high-temperature regenerator 2, and is fed to the high-temperature regenerator 2. In the high-temperature regenerator 2, the dilution solution is heated by the burner 8 to produce the vapor of the cooling medium, so that the solution is concentrated. During the cooling air-conditioning operation, a control valve 19 is closed, and the produced cooling medium vapor is fed to a heating pipe 14 of the low-temperature regenerator 3 to heat and concentrate the solution in the low-temeprature regenerator 3, and this vapor itself is converted into a cooling medium liquid and is fed to the condenser 4. On the other hand, the solution, concentrated by the high-temperature regenerator 2, effects a heat exchange with the dilution solution, which is fed from the absorber 1, at the second solution heat exchanger 7 to be lowered in temperature, and joins the concentrated solution from the low-temperature regenerator 3. The concentrated solution obtained by this joining effects a heat exchange with the dilution solution from the absorber 1 at the first solution heat exchanger 6 to be further lowered in temperature, and is fed to the absorber 1 to again absorb the cooling medium vapor from the evaporator 5, thus completing the circulation of the solution. On the other hand, the cooling medium vapor, which is produced at the low-temperature regenerator 3 when the solution is concentrated, is fed to the condenser 4 to be cooled and condensed by the cooling water which has cooled the absorber 1. The condensed cooling medium liquid is mixed with the cooling medium liquid from the heating pipe 14 of the low-temperature regenerator 3, and is fed to the evaporator 5 via the pipe. During the cooling air-conditioning operation, the control valve 17 at the discharge side of the cooling medium circulating pump 10 connected to the evaporator 5 is open, and the control valve 18 is closed. The cooling medium is circulated by the cooling medium circulating pump 10 via the control valve 17, and deprives a cold/hot water pipe 15 (through which the cold water is circulated) of the heat to be evaporated. The vapor of the evaporated cooling medium is fed to the absorber 1 via an eliminator 16. The residual cooling medium which has not been evaporated is collected at the lower portion of the evaporator 5, and is again circulated through the evaporator 5 by the cooling medium circulating pump 10. The cold water from which heat has been taken by the cooling medium at the cold/hot water pipe 15 is fed by the cold/hot water pump 12 to the indoor air-conditioners 13*a*, 13*b* and 13*c* so as to cool rooms associated therewith. The cold water of a raised temperature is collected, and is returned to the cold/hot water pipe 15 of the evaporator 5 to be cooled.

During the warming air-conditioning operation, the system operates as follows. During the warming operation, the cooling medium circulating pump 10 and the cooling water pump 11 are stopped, and the control valve 19 is open. The solution is heated by the burner 8 at the high-temperature regenerator 2 to produce the vapor, and the produced vapor is fed via the control valve 19 to a vessel which comprises the absorber 1 and the evaporator 5. This cooling medium vapor passes through the absorber 1 and the eliminator 16, into the evaporator 5, is condensed on the cold/hot water pipe 15, while heating the hot water flowing through the cold/hot water pipe 15, and is collected at the lower portion of the evaporator 5. The hot water is fed to the indoor air-conditioners 13*a*, 13*b* and 13*c* by the cold/hot water pump 12 to warm the rooms, and the warm water lowered in temperature is collected and returned to the cold/hot water pipe 15 of the evaporator 5 to be heated there. On the other hand, the cooling medium collected at the lower portion of the evaporator 5 overflows and flows into the absorber 1 to dilute the solution collected at the lower portion of the absorber 1. The diluted solution is fed by the solution circulating pump 9 to the high-temperature regenerator 2 via the first solution heat exchanger 6 and the second solution heat exchanger 7. During this time, at the first and second solution heat exchangers 6 and 7, this diluted solution effects a heat exchanging with the concentrated solution of a high temperature from the high-temperature regenerator 2, and therefore is preheated. At the high-temperature regenerator 2, the solution is again heated to produced the cooling medium vapor, and the concentrated solution passes through the second solution heat exchanger 7 and the first solution heat exchanger 6, so that this concentrated solution is lowered in temperature through a heat exchange with the dilution solution from the absorber 1, and then this concentrated solution is fed to the absorber 1.

Figure 2:
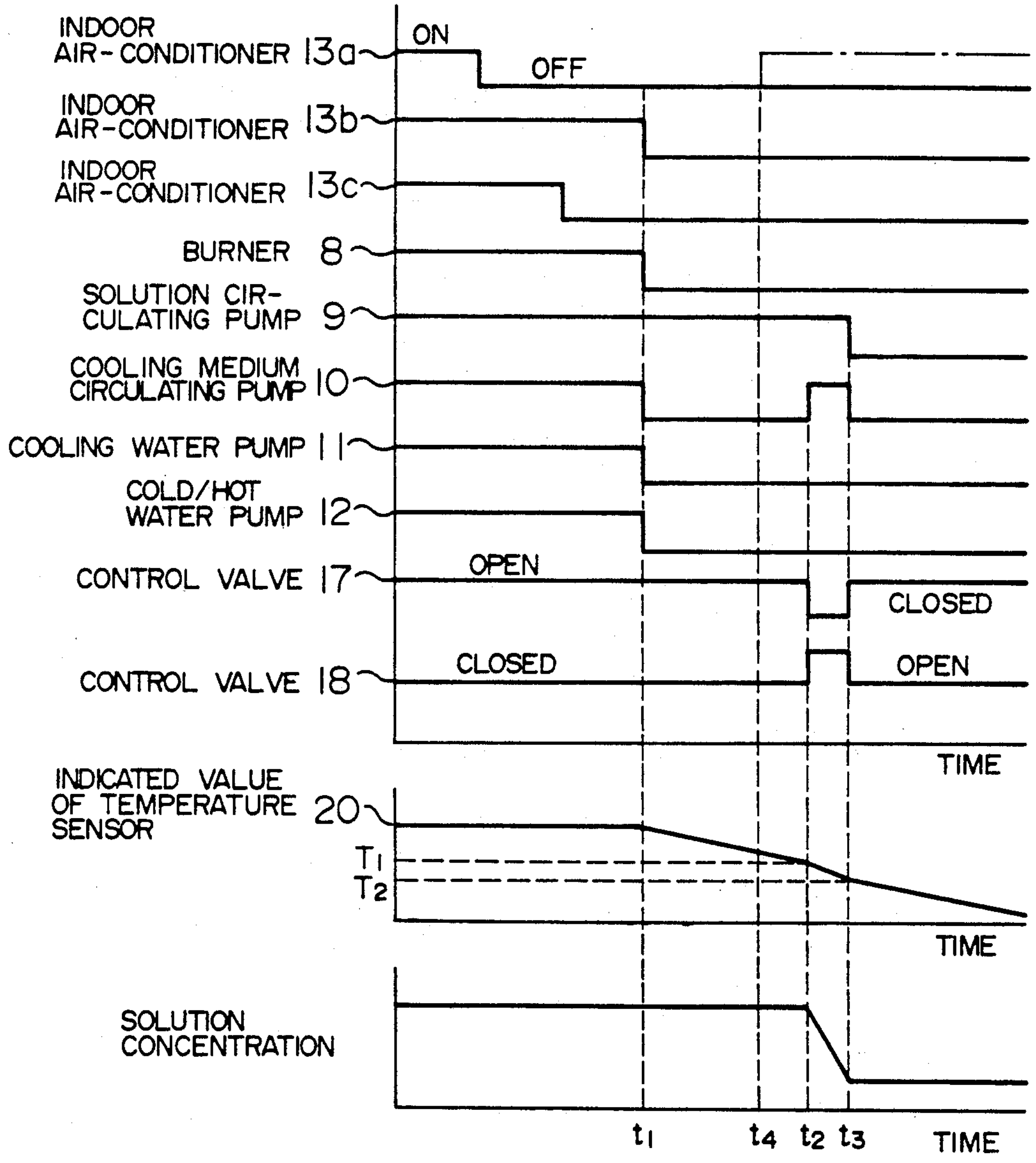
FIG. 2 is a time chart illustrative of the control of the embodiment of FIG. 1.

Subsequently, the behavior of the system at the time when stopping its operation will be described with reference to a flow chart of FIG. 2. When the last one 13*b* of the operating indoor air-conditioners 13*a*, 13*b* and 13*c* is stopped at time t1, a stop signal of the controller 21*b* for the indoor air-conditioner 13*b* is sent to the control device 22. In response to this signal, the control device 22 effects the control of stopping the burner 8, the cooling medium circulating pump 10, the cooling water pump 11 and the cold/hot water pump 12. The solution circulating pump 9 is continued to be operated, and the solution, while kept at a high concentration, is circulated through the absorber 1, the high-temperature regenerator 2 and the low-temperature regenerator 3. During this time, the indicated value of the temperature sensor 20 gradually decreases. When this value reaches a temperature T1, the control device 22 switches the control valve 17 from its open state to its closed state and the control valve 18 from its closed state to its open state, and also activates the cooling medium circulating pump 10 again so that the cooling medium is fed from the cooling medium reservoir (which is provided at the lower portion of the evaporator 5) via the cooling medium circulating pump 10 and the control valve 18 to the solution reservoir at the lower portion of the absorber 1, thereby diluting the solution. At this time, if the system is constituted such that switching of the control valve 18 is effected at a timing slightly earlier than the timing of switching the control valve 17, a hammering phenomenon in the solution pipe can be avoided, and the cooling medium circulating pump 10 and the control valves 17 and 18 are prevented from damage. The dilution operation is effected for a predetermined time period from time t2 to the time t3, and after the dilution of the solution has been completed, the control device 22 stops the solution circulating pump 9 and the cooling medium circulating pump 10, and switches the control valve 17 from its closed condition to its open condition and the control valve 18 from its open condition to its closed condition. The dilution time may be controlled based on empirical values, using a timer or the like.

In the above control, when an operation switch for the indoor air-conditioner 13*a* is turned on at time t4 intermediate between time t1 and time t2, the burner 8, the cooling medium circulating pump 10, the cooling water pump 11 and the cold/hot water pump 12 are activated to resume the operation. At this time, since the solution has not been diluted and is kept in a concentrated condition, there is no heat to concentrate the solution, and therefore the ability of the system to resume operation rapidly can be effectively exercised.

As described above, according to this embodiment, the last one of the operating indoor air-conditioners is immediately stopped by the stop signal of the controller for this indoor air-conditioner, and therefore a wasteful operation of the indoor air-conditioner is avoided, and the comfort level in the rooms can be maintained. In addition, since the dilution operation is not carried out immediately after stopping the absorption air-conditioning system, the solution in the system is maintained in a concentrated condition for a while after the operation has been stopped. Therefore, if the absorption air-conditioning system is required to be activated again during that time, the activating operation can be completed relatively rapidly, so that the air-conditioning can be carried out rapidly.

In this embodiment, although the control is effected such that the cold/hot water pump is stopped when the operation of the indoor air-conditioners is stopped, the air-conditioning by the indoor air-conditioners may be carried out by means of such a modified arrangement in which a cold/hot water pipe bypassing the indoor air-conditioners is provided, and at the time of stopping the operation, the cold/hot water is controlled by a control valve so as not to pass through the indoor air-conditioners but to pass through this bypass pipe.

Further, even when the cold/hot water is circulating through the evaporator and the indoor air-conditioners, the indoor air-conditioners may be stopped by stopping the dispersion of the cooling medium at the evaporator, or by stopping the circulation of the cooling water, or by stopping the dispersion of the solution at the absorber, or by stopping the dispersion of the solution and the circulation of the cooling water at the absorber, and freezing of the cooling medium and the cold water may be prevented without diluting the solution. Alternatively, the pipes for returning the solution from the high-temperature regenerator and the low-temperature regenerator to the absorber may be connected to the solution reservoir at the lower portion of the absorber, and piping of another line may be provided to carry out the dispersion of the solution, so that the dispersion of the solution to the absorber can be stopped while circulating the solution.

In this embodiment, although the solution is circulated during the period of time between the stop of the indoor air-conditioners and the start of the dilution operation, the circulation of the solution may be stopped. In this case, since the solution circulating pump is not operated, there is an advantage that the operation is carried out in an energy-saving manner.

In this embodiment, although the switching of the passage of the cooling medium is effected by the two control valves during the dilution operation, this switching may be carried out by a three-way valve. Also, this switching may be carried out by one control valve which is provided on the pipe for connecting the discharge side of the cooling medium pump to the solution system. In this case, part of the cooling medium is dispersed also to the evaporator 5 during the dilution operation in order to, therefore prevent the freezing of the cooling medium and the cold/hot water. It is necessary to stop the dispersion of the solution to the absorber 1, or to stop the flow of the cooling water to the absorber 1, or to stop both of this dispersion and this flow.

In this embodiment, although feeding of the cooling medium to the solution system during the dilution operation is effected at a portion in the solution reservoir which is at the lower portion of the absorber, the cooling medium may be fed to the high-temperature regenerator 2 or the low-temperature regenerator 3. In this case, since the cooling medium is fed directly to the solution of a high concentration, the dilution can advantageously be carried out rapidly, and also this is effective against the crystallization. Also, the position of feeding of the cooling medium may be at the return pipe extending from the high temperature regenerator 2 or the low-temperature regenerator 3 to the absorber 1. In this case, the arrangement obviates such a disadvantage that at the time of starting the dilution operation, the solution in the return piping leading to the absorber 1 is rapidly cooled and crystallized at the first solution heat exchanger 6 and the second solution heat exchanger 7.

In this embodiment, although the temperature sensor 20 for measuring the temperature of the solution is provided on the solution return pipe, which pipe leads to the absorber 1, at the outlet of the second solution heat exchanger 7, this temperature sensor may be provided on the solution return pipe, which leads to the absorber 1, at the outlet of the first solution heat exchanger 6. Alternatively, two temperature sensors 20 may be provided respectively at the outlets of the first and second solution heat exchangers 6 and 7, in which case the time of starting the dilution operation is determined from drops of the temperatures measured by the two temperature sensors.

In this embodiment, although the time of starting the dilution operation is controlled by the indicated value of the temperature sensor 20, the dilution starting time may be determined by a timer, in which case an optimum time interval is beforehand set in the system. In this case, the arrangement has an advantage that the control system is simplified because of the omission of the temperature sensor 20.

The speed of drop of the solution temperature, as well as the optimum solution dilution time, is varied little by little dependent on the operating condition of the system immediately before the start of the dilution operation. Therefore, taking these into consideration, the solution temperature for starting the dilution operation, as well as the set time of the timer, has to be properly determined. Also, the control device used may be constituted such that it has a learning function by, effectively, observing the behavior of the system in accordance with the operating condition immediately before the start of the dilution operation and varying the set temperature for starting the dilution, as well as the set time of the timer. In this case, a more precise and reliable control can be performed, and the air-conditioning can be provided with a high level of comfort and in a highly energy-saving manner. Further, when the operating condition of the system is varied, or when the operating medium is varied, these can be easily dealt with, and therefore advantageously, there is no need to design and provide separate control devices for this end.

In this embodiment, although the system is so constituted as to feed the circulating solution from the absorber 1 to the high-temperature regenerator 2 and the low-temperature regenerator 3 in a parallel manner, the circulating solution may be fed in series to the low-temperature regenerator 3 via the high-temperature regenerator 2, or to the high-temperature regenerator 2 via the low-temperature regenerator 3. With such arrangement, similar effects can be obtained. In this case, the temperature sensor 20 for measuring the temperature of the solution should preferably be provided on the solution return pipe, which leads to the absorber 1, at the outlet of the first solution heat exchanger 8 where the solution is high in concentration and is low in temperature.

In this embodiment, although the temperature of the solution detected by the temperature sensor 20 can be surmised as a measure of estimating the degree of margin for crystallization of the solution, it can be estimated more precisely by additionally providing a concentration sensor at the same position and surmising the degree of margin for crystallization from both sensors. By doing so, the reliability of the dilution operation is improved.

Figure 3:
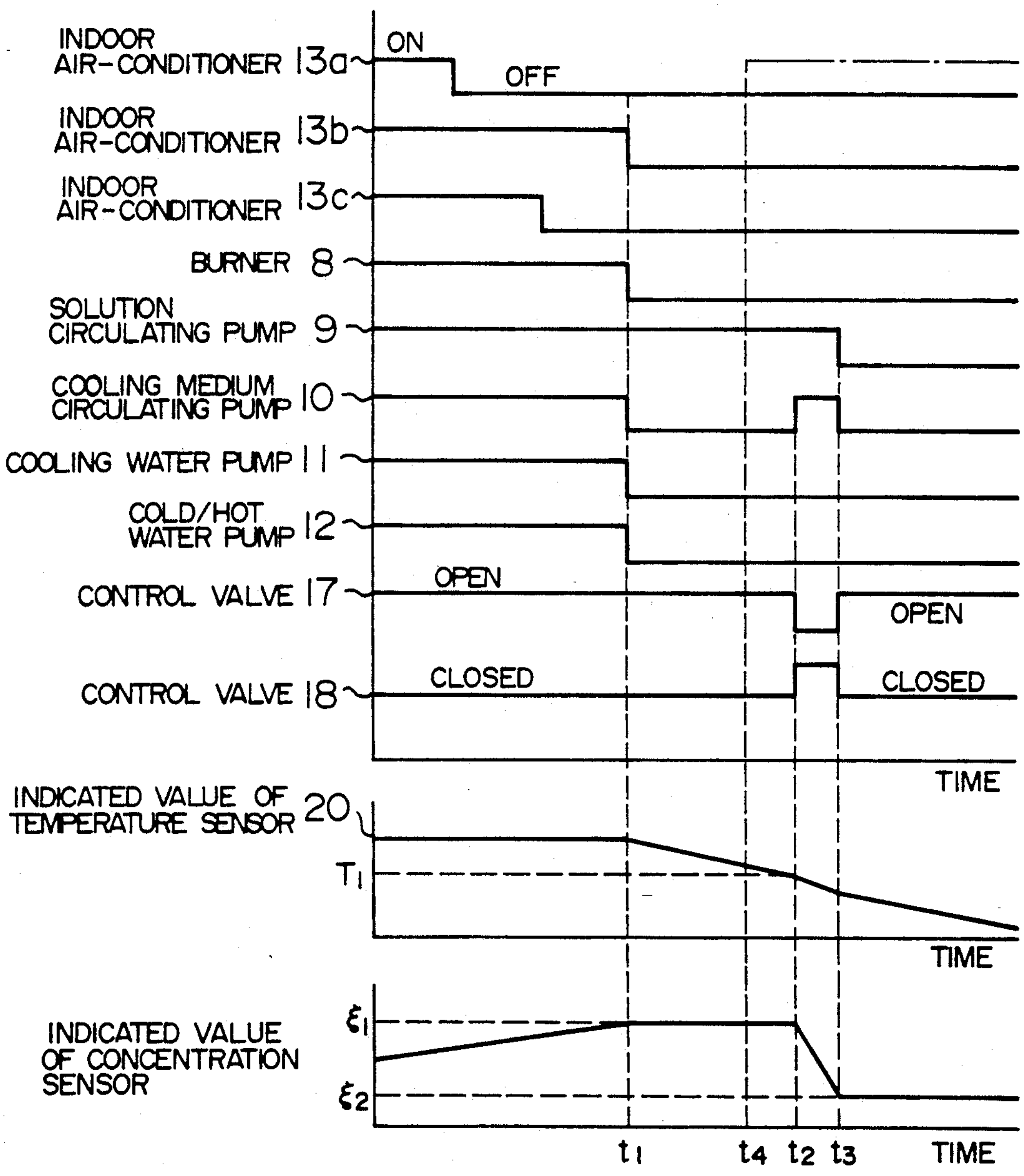
FIG. 3 is a time chart illustrative of the control of another embodiment of the invention.

The behavior of the system at the time of stopping the operation in the above case will be described with reference to a flow chart of FIG. 3. When the last one 13*b* of the operating indoor air-conditioners 13*a*, 13*b* and 13*c* is stopped at time t1, the stop signal of the controller 21*b* for the indoor air-conditioner 13*b* is sent to the control device 22. In response to this signal, the control device 22 effects the control of stopping the burner 8, the cooling medium circulating pump 10, the cooling water circulating pump 11 and the cold/hot water pump 12. The solution circulating pump 9 is continued to be operated, and the solution, while kept at a high concentration $\xi_1$, is circulated through the absorber 1, the high-temperature regenerator 2 and the low-temperature regenerator 3. During this time, the indicated value of the temperature sensor 20 gradually decreases, and the degree of margin for crystallization, which is determined by the concentration $\xi_1$ and the temperature T, also decreases. At time t2 when the solution temperature reaches T1 at which the degree of crystallization margin decreases to a predetermined level, the control device 22 switches the control valve 17 from its open condition to its closed condition and the control valve 18 from its closed condition to its open condition, and also activates the cooling medium circulating pump 10, again, so that the cooling medium is fed from the cooling medium reservoir (which is provided at the lower portion of the evaporator 5) via the cooling medium circulating pump 10 and the control valve 18 to the solution reservoir at the lower portion of the absorber 1, thereby diluting the solution. Then, at time t3 when the solution is diluted to a concentration $\xi_2$ which provides a sufficient degree of crystallization margin at the normal temperature, the dilution is completed, and the control device 22 effects the control of stopping the solution circulating pump 9 and the cooling medium circulating pump 10, and switching the control valve 17 from its closed condition to its open condition and the control valve 18 from its open condition to its closed condition. In this case, the degree of crystallization margin is estimated by the use of both of the temperature and the concentration, and therefore advantageously, the time of start of the dilution and the time of stop of the dilution can be determined more precisely so that the time during which the concentration of the solution is kept high can advantageously be made longer.

Further, when using the concentration sensor in addition to the temperature sensor, the dilution operation does not need to be carried out at one time, but can be carried out several times in a divided manner so as to gradually effect the dilution.

Figure 4:
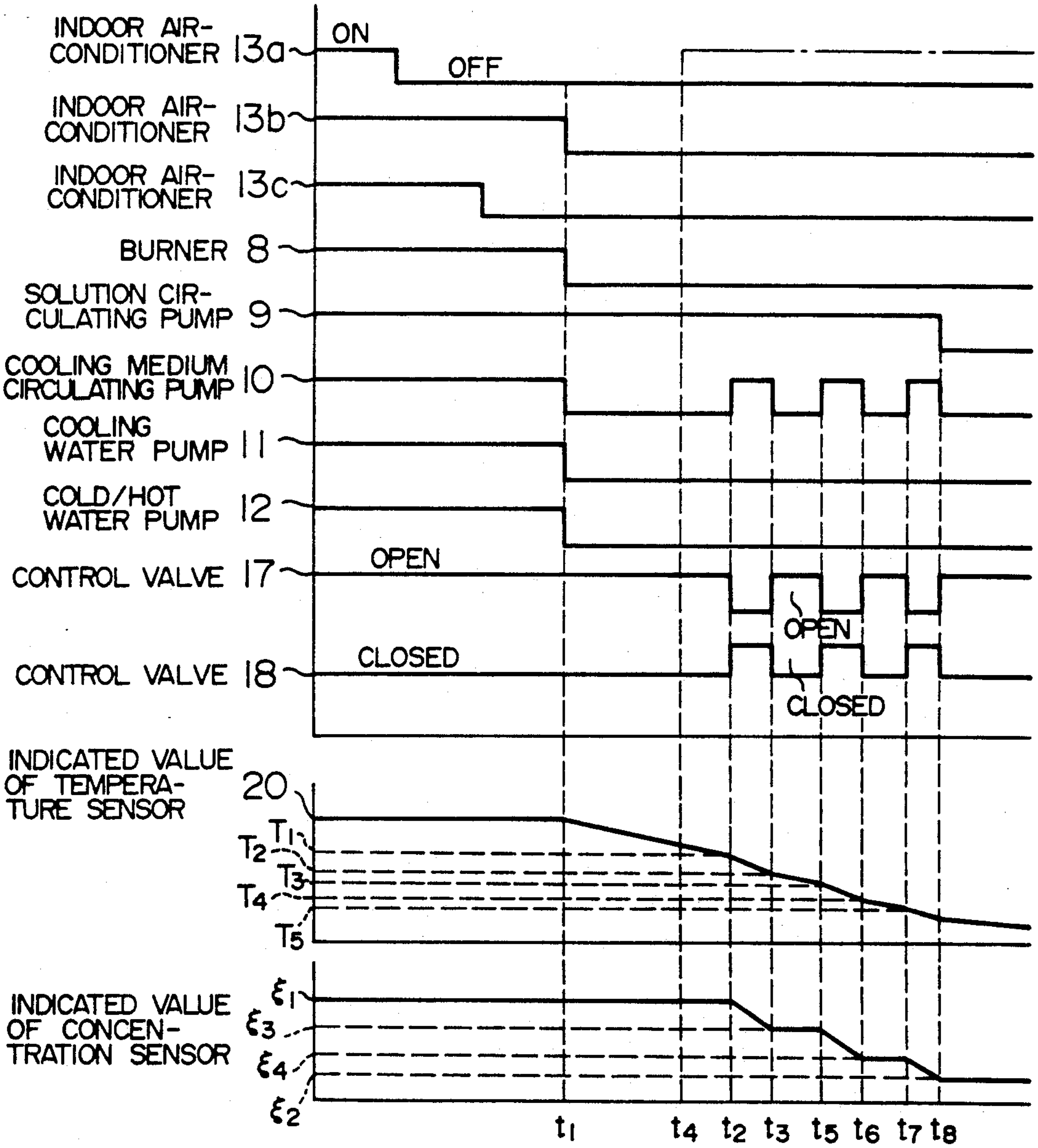
FIG. 4 is a time chart illustrative of the control of a further embodiment of the invention.

The behavior of the system at the time of stopping the operation in the above case will be described with reference to a flow chart of FIG. 4. When the last one 13*b* of the operating indoor air-conditioners 13*a*, 13*b* and 13*c* is is stopped at time t1, the stop signal of the controller 21*b* for the indoor air-conditioner 13*b* is sent to the control device 22. In response to this signal, the control device 22 effects the control of stopping the burner 8, the cooling medium circulating pump 10, the cooling water circulating pump 11 and the cold/hot water pump 12. The solution circulating pump 9 is continued to be operated, and the solution, while kept at the high concentration $\xi_1$, is circulated through the absorber 1, the high-temperature regenerator 2 and the low-temperature regenerator 3. During this time, the indicated value of the temperature sensor 20 gradually decreases, and the degree of crystallization margin, which is determined by the concentration $\xi_1$, and the temperature T, also decreases. At time t2 when the solution temperature reaches T1 at which the degree of crystallization margin decreases to a predetermined level, the control device 22 switches the control valve 17 from its open condition to its closed condition and the control valve 18 from its closed condition to its open condition, and also activates the cooling medium circulating pump 10 again, so that the cooling medium is fed from the cooling medium reservoir (which is provided at the lower portion of the evaporator 5) via the cooling medium circulating pump 10 and the control valve 18 to the solution reservoir at the lower portion of the absorber 1, thereby diluting the solution. As a result, although the solution temperature T is lowered, the concentration is also lowered, and the degree of crystallization margin increases. Then, at time t3 when the solution temperature reaches T2 and the concentration reaches $\xi_3$ so that the degree of crystallization margin increases to a predetermined level, the control device 22 effects the control of stopping the cooling medium circulating pump 10 and switching the control valve 17 from its closed condition to its open condition and the control valve 18 from its open condition to its closed condition. The solution circulating pump 9 is continued to be operated, and the solution, while kept at the concentration $\xi_3$, is circulated through the absorber 1, the high-temperature regenerator 2 and the low-temperature regenerator 3. During this time, the indicated value of the temperature sensor 20 gradually decreases, and the degree of crystallization margin, which is determined by the concentration $\xi_3$ and the temperature T, also decreases.

At time t5 when the solution temperature reaches T3 at which the degree of crystallization margin decreases to a predetermined level, the control device 22 switches the control valve 17 from its open condition to its closed condition and the control valve 18 from its closed condition to its open condition, and also activates the cooling medium circulating pump 10 again, so that the cooling medium is fed from the cooling medium reservoir (which is provided at the lower portion of the evaporator 5) via the cooling medium circulating pump 10 and the control valve 18 to the solution reservoir at the lower portion of the absorber 1, thereby diluting the solution. As a result, although the solution temperature T is lowered, the concentration is also lowered, and the degree of crystallization margin increases. Then, at time t6 when the solution temperature reaches T4 and a concentration reaches $\xi_4$ so that the degree of crystallization margin increases to a predetermined level, the control device 22 effects the control of stopping the cooling medium circulating pump 10 and switching the control valve 17 from its closed condition to its open condition and the control valve 18 from its open condition to its closed condition. The solution circulating pump 9 is continued to be operated, and the solution, while kept at the concentration $\xi_4$, is circulated through the absorber 1, the high-temperature regenerator 2 and the low-temperature regenerator 3. During this time, the indicated value of the temperature sensor 20 gradually decreases, and the degree of crystallization margin, which is determined by the concentration $\xi_4$ and the temperature T, also decreases.

At time t7 when the solution temperature reaches T3 at which the degree of crystallization margin decreases to a predetermined level, the control device 22 switches the control valve 17 from its open condition to its closed condition and the control valve 18 from the closed condition to its open condition, and also activates the cooling medium circulating pump 10 again, so that the cooling medium is fed from the cooling medium reservoir (which is provided at the lower portion of the evaporator 5) via the cooling medium circulating pump 10 and the control valve 18 to the solution reservoir at the lower portion of the absorber 1, thereby diluting the solution. As a result, although the solution temperature T is lowered, the concentration is also lowered, and the degree of crystallization margin increases. Then, at time t8 when the solution is diluted to the concentration $\xi_2$ which provides a sufficient degree of crystallization margin at the normal temperature, the dilution is completed, and the control device 22 stops the solution circulating pump 9 and the cooling medium circulating pump 10, and switches the control valve 17 from its closed condition to its open condition and the control valve 18 from its open condition to its closed condition.

In the case described above, the solution is not diluted at one time, but the solution dilution is carried out several times in a divided manner. Therefore, advantageously, the time during which the concentration of the solution is kept high is longer, and the effect of shortening the time necessary for the re-activation after the stop of the operation can be improved more efficiently.

Another embodiment of the invention will be described with reference to FIG. 5. This embodiment differs from the embodiment of FIG. 1 in that instead of providing the pipe for connecting the discharge side of the cooling medium circulating pump 10 to the solution circulating system, as well as the control valve 18 and 17 mounted on this pipe, a control valve 23 is provided on the pipe which feeds the liquid cooling medium from the condenser 4 to the evaporator 5, and that the cooling medium liquid reservoir at the lower portion of the evaporator 5 has a size smaller than an amount of the cooling medium collected at the time of the stop of the operation. The control of this system is effected such that the control valve 23 is open during the operation, the control valve 23 is switched from its open condition to its closed condition when the operation of the indoor air-conditioners 13*a*, 13*b* and 13*c* is stopped, and the control valve 23 is switched from its closed condition to its open condition when starting the dilution. In this embodiment, since the control valve 23 is closed at the time of stopping the operation, the cooling medium liquid collected at the lower portion of the condenser 4 does not flow into the evaporator 5, but is retained in the condenser 4. And, since the control valve 23 is switched from its closed condition to its open condition at the time of starting the dilution, the collected cooling medium liquid at the lower portion of condenser 4 flows into the cooling medium liquid reservoir at the lower portion of the evaporator 5, and the cooling medium overflows from this cooling medium liquid reservoir and flows into the absorber 1 to dilute the solution. According to this embodiment, similar effects as achieved with the preceding embodiment can be obtained, and besides since the cooling medium circulating pump is not operated during the dilution operation, an energy-saving operation can advantageously be carried out. Further, since the dilution operation can be carried out merely by controlling the control valve 23, the control can advantageously be simplified.

Figure 6:
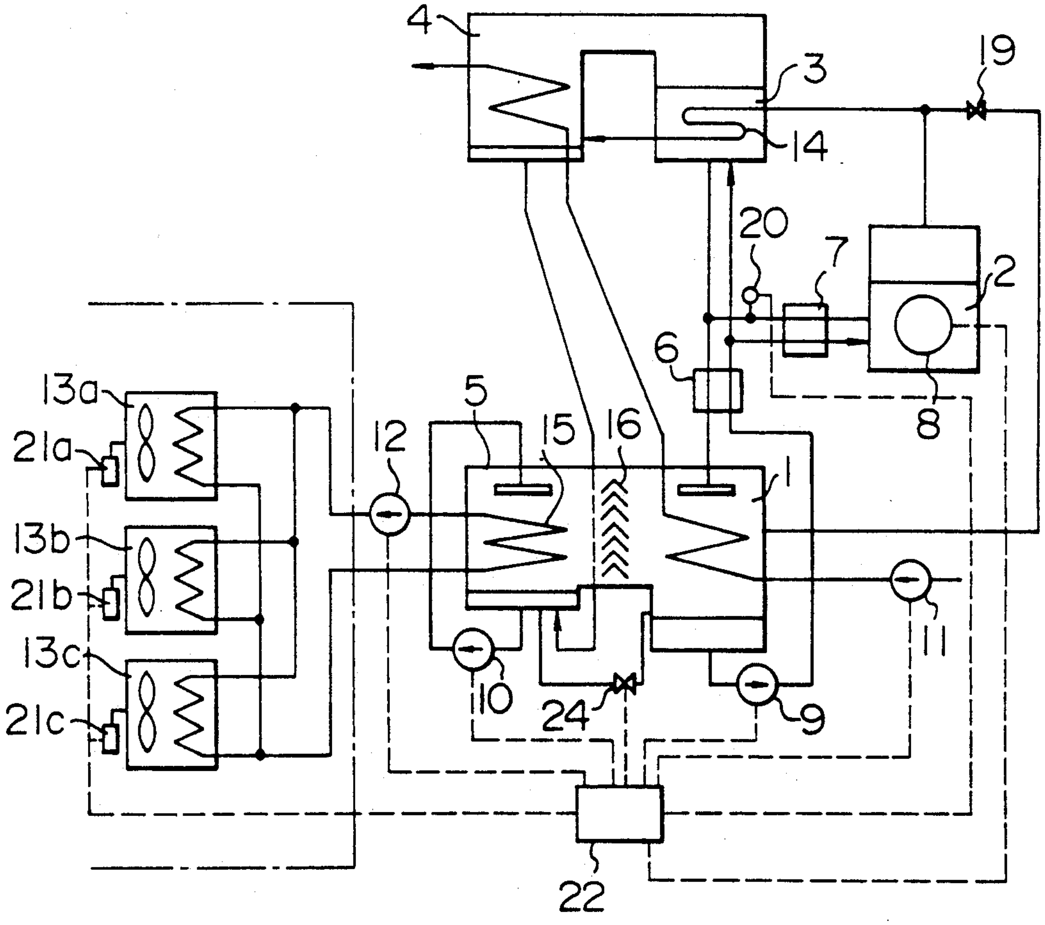
FIG. 6 is a system diagram of a further embodiment of the invention.

A further embodiment of the invention will be described with reference to FIG. 6. This embodiment differs from the embodiment of FIG. 1 in that instead of providing the pipe for connecting the discharge side of the cooling medium circulating pump 10 to the solution circulating system, as well as the control valves 18 and 17 mounted on this pipe, the cooling medium liquid reservoir at the lower portion of the evaporator 5 is disposed at a level higher than the solution reservoir at the lower portion of the absorber 1, and that these two reservoirs are connected to each other by a pipe on which a control valve 24 is provided. Normally, the control valve 24 is closed, and only at the time of the dilution operation, the control valve 24 is opened. In this embodiment, since the control valve 24 is switched to its open condition at the time of the dilution operation, the cooling medium liquid collected in the cooling medium liquid reservoir at the lower portion of the evaporator 5 flows into the cooling medium liquid reservoir at the lower portion of the absorber 1 due to the head difference between these reservoirs, thereby diluting the solution. According to this embodiment, similar effects as achieved with the embodiment of FIG. 1 can be obtained, and besides since the cooling medium circulating pump 10 is not operated during the dilution operation, an energy-saving operation can advantageously be carried out. Further, since the dilution operation can be carried out merely by controlling the control valve 24, the control can advantageously be simplified.

What is claimed is:

1. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor provided on a solution feed pipe between said regenerator and said absorber; and control means for controlling solution dilution operation of said outdoor unit, said control means receiving a temperature signal of said temperature sensor and start and stop signals of said indoor air-conditioner, and said control means, in response to the signals of said indoor air-conditioner and temperature sensor, directing start of the dilution operation after a time period in accordance with a decrease in temperature of the solution when said indoor air-conditioner is stopped.

2. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor provided on a solution feed pipe between said regenerator and said absorber; and control means for controlling solution dilution operation of said outdoor unit, said control means receiving a temperature signal of said temperature sensor and start and stop signals of said indoor air-conditioner, and said control means, in response to the signals of said indoor air-conditioner and temperature sensor, directing start of the dilution operation after a time period in accordance with a decrease in temperature of the solution when said indoor air-conditioner is stopped, and then directing stop of the dilution operation according to a resultant temperature of the solution.

3. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor provided on a solution feed pipe between said regenerator and said absorber; and control means for controlling solution dilution operation of said outdoor unit, said control means receiving a temperature signal of said temperature sensor, start and stop signals of said indoor air-conditioner and start and stop signals of said cold/hot water pump, and said control means, in response to the start and stop signals and temperature sensor signal, directing start of the dilution operation after a time period in accordance with a decrease in temperature of the solution when said indoor air-conditioner and said cold/hot water pump are stopped.

4. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor provided on a solution feed pipe between said regenerator and said absorber; and control means for controlling solution dilution operation of said outdoor unit, said control means receiving a temperature signal of said temperature sensor, start and stop signals of said indoor air-conditioner and start and stop signals of said cold/hot water pump, and said control means, in response to the start and stop signals and temperature sensor signal, directing start of the dilution operation after a time period in accordance with a decrease in temperature of the solution when said indoor air-conditioner and said cold/hot water pump are stopped, and then directing stop of the dilution operation according to a resultant temperature of the solution.

5. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor and a concentration sensor provided on a solution feed pipe between said regenerator and said absorber; and control means for controlling solution dilution operation of said outdoor unit, said control means receiving a temperature signal of said temperature sensor, a concentration signal of said concentration sensor and start and stop signals of said indoor air-conditioner, and said control means, in response to the signals of said concentration sensor, said indoor air-conditioner and said temperature sensor, directing start of the dilution operation after a time period in accordance with a decrease in temperature and a concentration of the solution when said indoor air-conditioner is stopped.

6. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor and a concentration sensor provided on a solution feed pipe between said regenerator and said absorber; and control means for controlling solution dilution operation of said outdoor unit, said control means receiving a temperature signal of said temperature sensor, a concentration signal of said concentration sensor, start and stop signals of said indoor air-conditioner and start and stop signals of said cold/hot water pump, and said control means, in response to the start and stop signals, temperature sensor signal and concentration signal, directing start of the dilution operation after a time period in accordance with a decrease in temperature and a concentration of the solution when said indoor air-conditioner and said cold/hot water pump are stopped.

7. An absorption air-conditioning system comprising:

an outdoor unit including an absorber, a regenerator, a solution heat exchanger, a condenser, an evaporator and piping means for operatively connecting said absorber, said regenerator, said solution heat exchanger, said condenser and said evaporator to one another, said piping means including means for transporting a solution and a cooling medium;

at least one indoor air-conditioner having cold/hot water piping means for connecting said indoor air-conditioner to said outdoor unit, said cold/hot water piping means including a cold/hot water pump;

a temperature sensor and a concentration sensor provided on a solution feed pipe between said regenerator and said absorber; and control means for controlling solution dilution operation of said outdoor unit, said control means receiving a temperature signal of said temperature sensor, a concentration signal of said concentration sensor, start and stop signals of said indoor air-conditioner and start and stop signals of said cold/hot water pump, and said control means, in response to the start and stop signals, temperature sensor signal and concentration signal, directing start of the dilution operation after a time period in accordance with a decrease in temperature and a concentration of the solution when said indoor air-conditioner and said cold/hot water pump are stopped, and then directing stop of the dilution operation according to resultant temperature and concentration of the solution.

8. An absorption air-conditioning system according to claim 6 or 7, wherein said dilution operation is carried out a plurality of times in a divided manner to gradually make concentration of the solution low.

9. An absorption air-conditioning system according to any one of claims 1 to 7, wherein said cooling medium transport means is connected at a discharge side thereof to a solution circulating system through a pipe having a control valve.

10. An absorption air-conditioning system according to any one of claim 1 to 7, further comprising control means having a function for learning with respect to timing of solution dilution and dilution time.

11. An absorption air-conditioning system according to claim 9, further comprising control means having a function for learning with respect to timing of solution dilution and dilution time.

12. An absorption air-conditioning system according to claim 8, wherein said cooling medium transport means is connected at a discharge side thereof to a solution circulating system through a pipe having a control valve.

* * * * *